Patented Mar. 9, 1937

2,073,506

UNITED STATES PATENT OFFICE 2,073,506

RECLAIMING LUBRICATING OILS

Vanderveer Voorhees, Hammond, Ind., assignor to Standard Oil Company, Chicago, Ill., a corporation of Indiana No Drawing. Application September 9, 1935, Serial No. 39,803

5 Claims. (Cl. 87—9)

This invention relates to the process of treating lubricating oils and more particularly, specially compounded lubricating oils which contain a high molecular weight, viscous, oil soluble resin hereinafter designated "viscoresin". An object of the invention is to reclaim viscoresins from lubricating oils which contain them and which have been deteriorated in use or for other reasons. Another object of the invention is to separate a mixture of viscoresins from each other. Other objects will appear as the description proceeds.

Viscoresins referred to herein are hydrocarbon resins having a molecular weight above 1000 and usually from 1000 to 10,000, the ratio of hydrogen to carbon being about 15% hydrogen to about 85% carbon. Other characteristics of these resins are a high retention of plasticity at low temperatures, even as low as $-100°$ F., absence of crystal formation, high solubility in mineral lubricating oils, almost complete freedom from color, high stability against oxidation and against the formation of colored asphaltic or sludgy compounds, and high viscosity at elevated temperatures. These resins may be prepared by the hydrogenation of rubber, natural rubber, butadiene rubber, cyclo rubber or other synthetic forms of rubber wherein the hydrogenation is carried to substantial freedom from unsaturation. They may also be prepared by the polymerization of olefin hydrocarbons under certain conditions which produce materials of high molecular weight. For example, butylene, isobutylene or amylene may be treated with a polymerizing catalyst, e. g., aluminum chloride or boron trifluoride, preferably at a low temperature, to produce the viscoresin directly, after which removal of the catalyst and any solvent employed in the reaction may be effected.

As a specific example of a suitable viscoresin to which this invention relates, isobutylene may be cooled to a temperature of $-80°$ F. and agitated with 1% of its weight of $BF_3$. A rapid reaction occurs and the temperature is prevented from rising appreciably by efficient cooling. The resulting product is a plastic hydrocarbon material substantially colorless and completely soluble in mineral lubricating oil. It may be dissolved in a solvent, e. g. hexane, washed with water, neutralized and then freed again from solvent.

Lubricating oils may be compounded with from ½% to 10% of viscoresin by adding the resin directly to the oil or adding the resin in solution in a low boiling solvent, e. g. naphtha, and subsequently evaporating the solvent. The viscosity of the compounded oil may be adjusted by controlling the amount of resin added thereto; for example, 2% of a resin made from isobutylene as above described will increase the viscosity of S. A. E. 10 grade oil from 162 seconds Saybolt at 100° F. to 255 seconds Saybolt at 100° F. The resulting compounded oil may be used for lubrication of internal combustion engines and any other service for which a viscous lubricating oil is required.

Because of the high resistance toward oxidation of the viscoresins, it has been found that there is substantially no deterioration of the resin during use in oils compounded with them. There is also little or no loss by evaporation. The oils with which they are compounded, however, may become seriously oxidized, vaporized or decomposed and accordingly unfit for further service. I have found that I may recover the viscoresin from such deteriorated oils by the use of special solvents in the manner hereafter described and reuse them in new oil. The solvents which I employ have a higher solubility for the oil than for the viscoresin under the conditions used. I have found that the liquefied hydrocarbon gases, more particularly liquid propane, butane and ethane, and mixtures of these, are especially suitable for carrying out my invention.

In purifying the viscoresins with these solvents, I dissolve them in the liquefied hydrocarbon gas, usually at ordinary temperature, and then effect a separation of a fraction by heating to a temperature near the critical temperature of the solvent employed. In the case of propane, this may be between 125° and 225° F., while in the case of ethane it will usually be below 100° F. When using butane, higher temperatures are required. The following examples will illustrate the method of carrying out the process.

Example 1

A deteriorated lubricating oil compounded of a refined S. A. E. 20 M-C distillate and 3% of isobutylene polymer is dissolved in four volumes of liquid propane. The solution is then heated to a temperature of 125-200° F., preventing evaporation by the application of pressure. Within this temperature range substantially all of the resin is precipitated from the solution whereas the hydrocarbon oil is maintained in solution in the propane and may be mechanically separated from the resin. The use of a larger proportion of propane facilitates the separation of the resin. Likewise substituting liquid ethane for propane, the separation may be made to occur at ordinary temperature and with lower proportions of solvent.

Example 2

A hydrogenated rubber which has been substantially saturated with hydrogen is dissolved in liquid propane at ordinary temperature using from 5 to 15 volumes of propane per volume of hydrogenated rubber. After clarification, the solution is heated to 150° F. and settled at that temperature. The viscous lower layer which separates is removed and freed from propane and is found to be more solid than the original hydro-rubber, while the material remaining in solution in the propane is more plastic.

Example 3

A mixture of liquefied olefine gases containing butylene, isobutylene, propylene and higher olefines such as amylene, trimethyl ethylene, etc., together with saturated hydrocarbons such as butane and pentane is subjected to polymerization with $AlCl_3$ at a low temperature between 0 and —80° F. The product remaining after removing the unreacted gases and light hydrocarbons is dissolved in liquid propane using from 6 to 10 volumes. On heating the solution to 160° F. a fraction is separated which is more solid than the original product, whereas the portion remaining in solution in the propane resembles a lubricating oil.

Before separating viscoresins with liquefied hydrocarbon gases, I may add suitable diluents, for example, benzol, naphtha, hexane, etc. to facilitate handling the plastic materials and modify the fractionating action of the liquefied gas. These diluents are usually removed by distillation from the fractions. I may also extract the mixtures of viscoresins with liquefied hydrocarbon gases at an elevated temperature without initially getting them into complete solution. In this case, efficient agitation is required to obtain thorough contact.

In the foregoing description of this invention it should be understood that various methods may be used for purifying viscoresins either before or after separation from deteriorated lubricating oil. Such methods involve treatment of the resin, preferably in solution in a suitable oil or naphtha, with sulfuric acid, aluminum chloride, fuller's earth, sodium hydroxide and other alkalies, washing with water, extraction with solvents, distillation to remove oil, etc.

Although the invention has been described by means of specific examples, it should be construed as broadly as the art will permit in accordance with the following claims:

I claim:

1. The process of purifying viscoresins comprising dissolving said resins in a liquefied normally gaseous hydrocarbon solvent, heating the resulting solution to a temperature in the vicinity of the critical temperature of said solvent, whereupon a fraction of said viscoresins is separated, removing said separated fraction from the remaining solution and removing solvent from said fraction.

2. The process of recovering viscoresins from waste lubricating oil with which they are compounded, comprising treating said oil with a liquefied normally gaseous hydrocarbon solvent which has sufficient solvent action on the oil component to retain said component in solution under the conditions employed but sufficiently low solvent action on said viscoresin to cause precipitation thereof, and controlling the temperature of the solvent and oil mixture to prevent the separation of said oil.

3. The process of reclaiming viscoresin from deteriorated mineral lubricating oil with which it is compounded, comprising separating said resin from said compounded oil by precipitation with a liquefied normally gaseous hydrocarbon solvent, removing said resin from said oil, subjecting said resin to a chemical refining treatment and thereafter dissolving said resin in a further quantity of refined mineral lubricating oil.

4. The method of removing oils and other undesired impurities from polymerized isobutylene containing such materials, which comprises mixing said isobutylene polymer together with its oils and impurities with liquid propane and subjecting the mixture to a temperature of about 125 to 200° F. under a pressure sufficient to maintain the hydrocarbon in the liquid state, said temperature being high enough to effect the precipitation of said isobutylene polymer from the propane solution of oil, removing said precipitated isobutylene polymer from said propane solution and separating propane from the removed isobutylene polymer.

5. The method of claim 4 which includes the further step of removing other impurities from the isobutylene polymer by chemical treatment.

VANDERVEER VOORHEES.